(12) United States Patent
Kim et al.

(10) Patent No.: US 8,115,803 B2
(45) Date of Patent: Feb. 14, 2012

(54) APPARATUS AND METHOD FOR PROJECTING SPATIAL IMAGE

(75) Inventors: Eun-Soo Kim, Seoul (KR); Seung-Cheol Kim, Seoul (KR)

(73) Assignee: Kwangwoon University Research Institute for Industry Cooperation, Seoul (KR)

( * ) Notice: Subject to any disclaimer, the term of this patent is extended or adjusted under 35 U.S.C. 154(b) by 1274 days.

(21) Appl. No.: 11/820,650

(22) Filed: Jun. 19, 2007

(65) Prior Publication Data
US 2007/0296806 A1  Dec. 27, 2007

(30) Foreign Application Priority Data

Jun. 19, 2006  (KR) .................. 10-2006-0054971

(51) Int. Cl.
*H04N 7/00* (2011.01)
(52) U.S. Cl. .................. 348/42; 345/694; 382/206
(58) Field of Classification Search .............. 348/36, 348/42; 345/694; 382/206
See application file for complete search history.

(56) References Cited

U.S. PATENT DOCUMENTS

| | | | | |
|---|---|---|---|---|
| 5,170,037 A | * | 12/1992 | Van Amstel et al. | 250/235 |
| 5,546,139 A | * | 8/1996 | Bacs et al. | 348/754 |
| 5,617,203 A | * | 4/1997 | Kobayashi et al. | 356/237.5 |
| 7,397,443 B2 | * | 7/2008 | Sugiura | 345/1.1 |
| 2006/0033732 A1 | * | 2/2006 | Fukushima et al. | 345/419 |

FOREIGN PATENT DOCUMENTS

| | | |
|---|---|---|
| JP | 2000-75243 | 3/2000 |
| JP | 3081816 | 9/2001 |
| JP | 2004-015793 | 1/2004 |
| JP | 2004-29687 | 1/2004 |
| KR | 1996-0005173 | 2/1996 |

OTHER PUBLICATIONS

Office Action for Japanese Patent Application No. 2007-160670 dated Mar. 2, 2010 by Japanese Patent Office.

* cited by examiner

*Primary Examiner* — Moustafa M Meky
(74) *Attorney, Agent, or Firm* — Knobbe, Martens, Olson & Bear LLP

(57) ABSTRACT

An apparatus and method for projecting a spatial image is disclosed. In one embodiment, the apparatus includes i) a monitor, which outputs the spatial image, ii) an image direction control unit, which controls the direction of the spatial image outputted from the monitor and controls a viewing angle, and iii) a half-mirror, which transflects the spatial image whose direction is adjusted by the image direction control unit. At least one embodiment of the present invention modifies the conventional barrier technology, which has been used to control 3D images or viewing angles, to enhance a sense of realism by adjusting the direction of light emitted from a display device.

15 Claims, 18 Drawing Sheets

Visible range

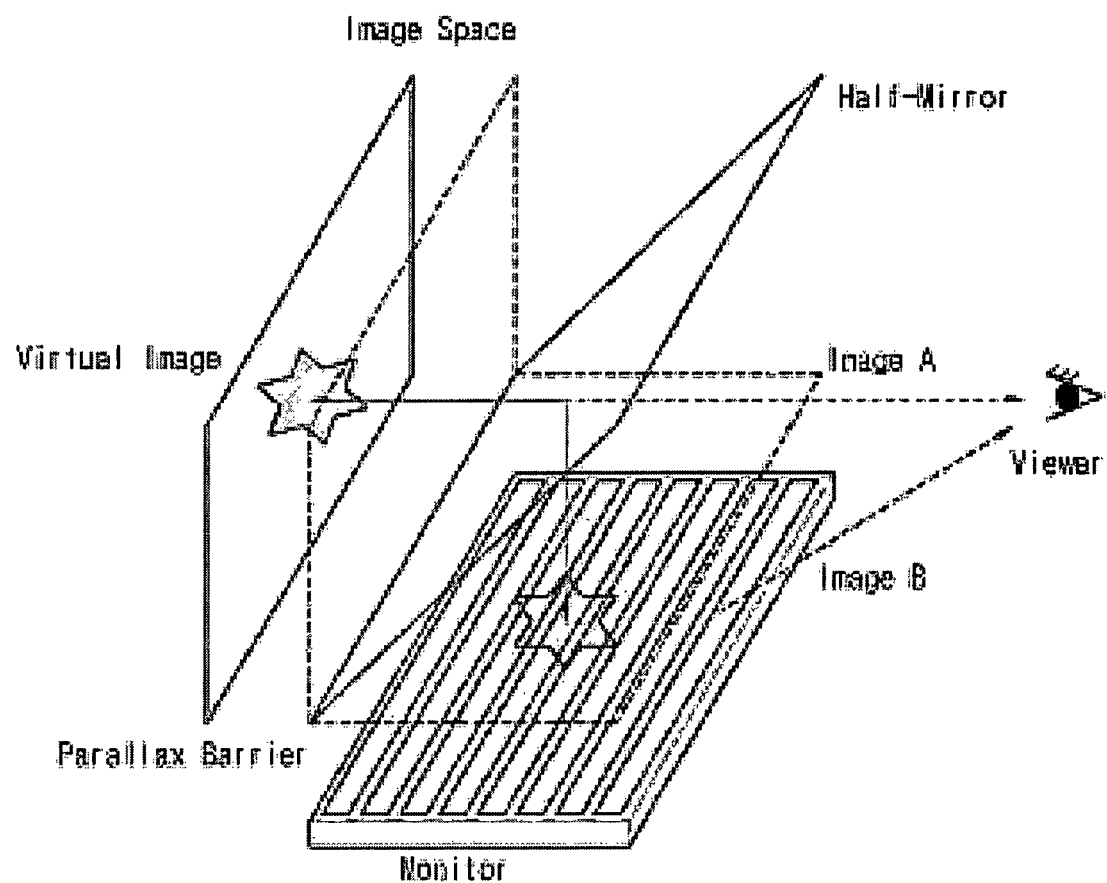

FIG. 11C
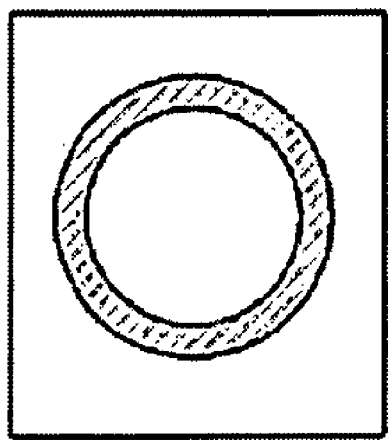
slice1
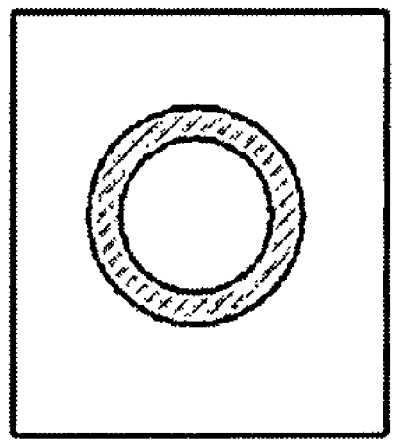
slice2
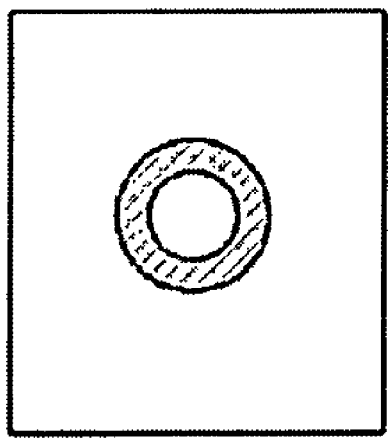
slice3
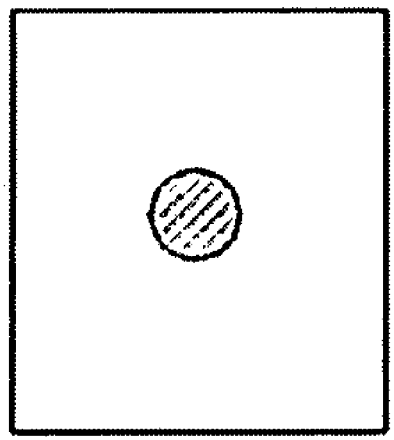
slice4

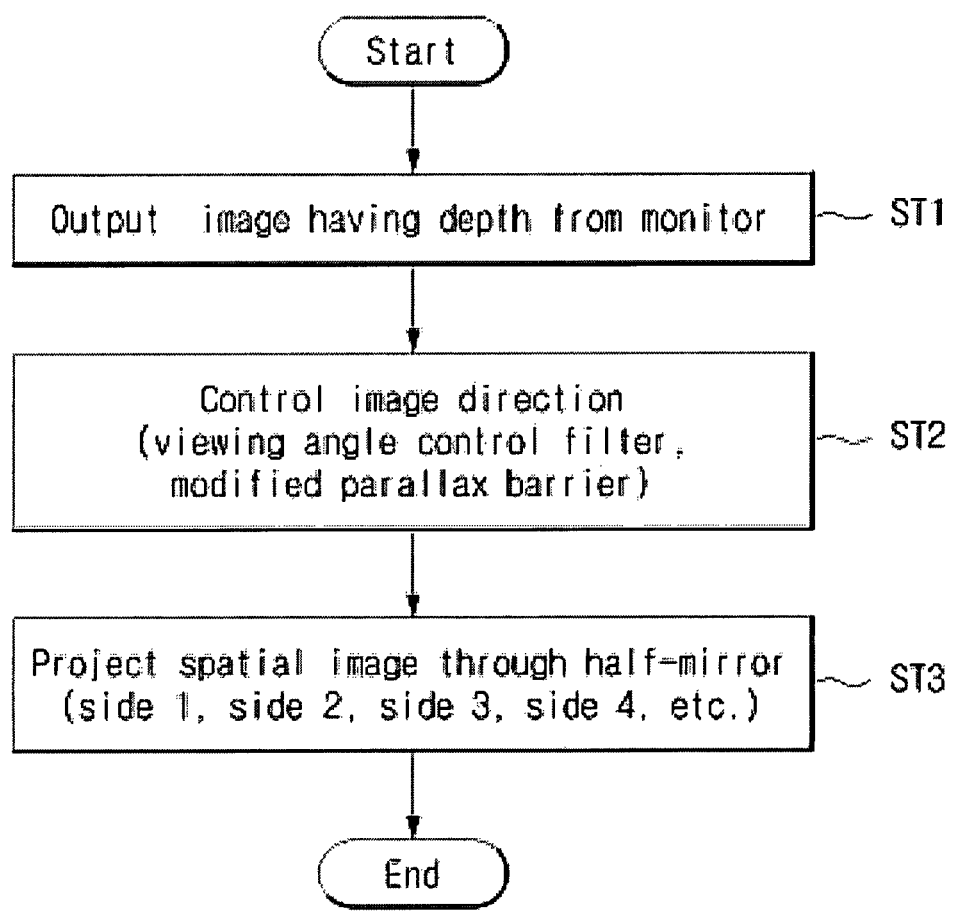

APPARATUS AND METHOD FOR PROJECTING SPATIAL IMAGE

CROSS-REFERENCE TO RELATED PATENT APPLICATIONS

This application claims the benefit of Korean Patent Application No. 10-2006-0054971, filed on Jun. 19, 2006, in the Korean Intellectual Property Office, the disclosure of which is incorporated herein in its entirety by reference.

BACKGROUND OF THE INVENTION

1. Field of the Invention

The present invention relates to an apparatus and method for projecting a spatial image, more specifically to an apparatus and method for projecting a spatial image that enhances a sense of reality by adjusting the direction of light emitted from a display device through modifying the barrier technology, which has been conventionally used for controlling three-dimensional (3-D) images or viewing angles.

2. Description of the Related Technology

A spatial image generally refers to a realistic image that provides depth and spatial information, unlike two-dimensional images. Dubbed a 3D image, this image of spatially-cognitive concept is collectively reorganized in the brain while human eyes (both eyes) recognize a previously-experienced environment having a volume. Such a spatial image provides a sense of presence, realism and virtual reality as if a viewer is present at the scene. An apparatus for projecting a spatial image renders a sense of volume that is similar to watching a real object, by displaying 3D images with depth, which have been impossible in conventional 2D planar display devices.

SUMMARY OF CERTAIN INVENTIVE ASPECTS

One aspect of the present invention is an apparatus and method for projecting a spatial image that can make a display device invisible from a viewer and enhance the sense of realism by modifying the barrier method, which has been conventionally used to control 3D images or viewing angles, to adjust the direction of light emitted from a display device.

Another aspect of the present invention is an apparatus and method for projecting a spatial image that can enhance the sense of realism by using the polarization of light to allow the viewer to see an image projected through a half-mirror, to have an image directly projected from the display device filtered by a polarization filter and to make the image directly projected form the display device invisible by the viewer.

Another aspect of the present invention is an apparatus and method for projecting a spatial image that can deliver a sense of depth even in a spatial image by using a display device that can express the sense of depth, such as, for example, piling up LCDs, instead of using a conventional two-dimensional display device.

Another aspect of the invention is an apparatus for projecting a spatial image, which comprises i) a monitor, which outputs the spatial image, ii) an image direction control unit, which controls the direction of the spatial image outputted from the monitor and controls a viewing angle, and iii) a half-mirror, which transflects the spatial image whose direction is adjusted by the image direction control unit.

The monitor may be a monitor that can provide a sense of depth.

The monitor may be a liquid crystal display (LCD) module that can provide a sense of depth.

In one embodiment, the LCD module has a backlight unit, which outputs an image having information on the depth of an object, a slicing unit, which obtains sliced images sequentially in accordance with the depth information outputted from the backlight unit and outputs the images after piling up the images.

The image direction control unit may include a viewing angle control filter controlling a viewing angle through polarization of light.

The viewing angle control filter may control the viewing angle such that an observer can see a 3D illusion through the half-mirror but not directly on the monitor.

The image direction control unit may include a modified parallax barrier.

The modified parallax barrier may control the viewing angle such that an observer can see a 3D illusion through the half-mirror but see an image other than the 3D illusion directly on the monitor.

In one embodiment, the half-mirror has one or more sides.

The half-mirror may have four sides. The monitor may output front, back, left and right images. The image direction control unit may control viewing angles of the 4 sides of the half-mirror.

Another aspect of the invention is a method of projecting a spatial image, which comprises, i) outputting a spatial image having a sense of depth through a monitor (ST1), ii) controlling by an image direction control unit a direction of the image outputted in the outputting step and controlling a viewing angle (ST2) and iii) projecting the spatial image through a half-mirror after the controlling step (ST3).

The controlling may comprise controlling the viewing angle by a viewing angle control filter using polarization of light such that an observer can see a 3D illusion through the half-mirror but not directly on the monitor.

In one embodiment, the controlling comprises controlling the viewing angle by a modified parallax barrier such that an observer can see a 3D illusion through the half-mirror but see an image other than the 3D illusion directly on the monitor.

In one embodiment, the projecting comprises projecting the spatial image through the half-mirror that consists of one or more sides.

BRIEF DESCRIPTION OF THE DRAWINGS

FIG. 9 shows a conceptual diagram of an example of displaying a spatial image using a parallax barrier that is modified from FIG. 6.

FIG. 11*c* shows a conceptual diagram of an example of forming slice images of the ball image of FIG. 11*a* to sequentially output an image with a sense of depth.

FIG. 14 shows a flowchart of a method of projecting a spatial image in accordance with an embodiment of the present invention.

DESCRIPTION OF CERTAIN INVENTIVE EMBODIMENTS

Hereinafter, embodiments of the invention will be described with reference to accompanying drawings. In describing embodiments of the present invention, any detailed description of a related function or structure of common knowledge will be omitted if the description is deemed to unnecessarily cloud certain inventive aspects of the present invention. The terms used in the following description are defined by considering their functions in embodiments of the present invention, and can vary according to the user, intention of the user or case. The meaning of each term, therefore, should be interpreted within the overall context of this specification.

Figure 1:
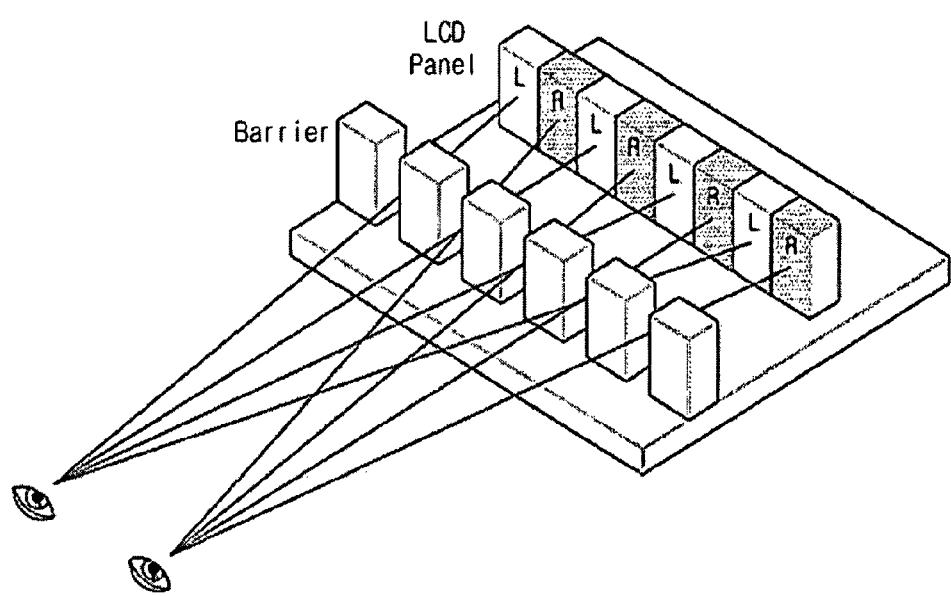
FIG. 1 shows a conceptual diagram of a typical parallax barrier method.

FIG. 1 shows a conceptual diagram of a typical parallax barrier method. In the parallax barrier method, images to be seen by each of the left eye and the right eye are alternately printed or projected in the vertical direction, and the human eyes see these images through very narrow vertical lattices (i.e., barrier).

By this arrangement, the vertical images viewed by the left eye and the vertical images viewed by the right eye are separated by the barriers, making the left eye and the right eye see images that are slightly different.

Figure 2:
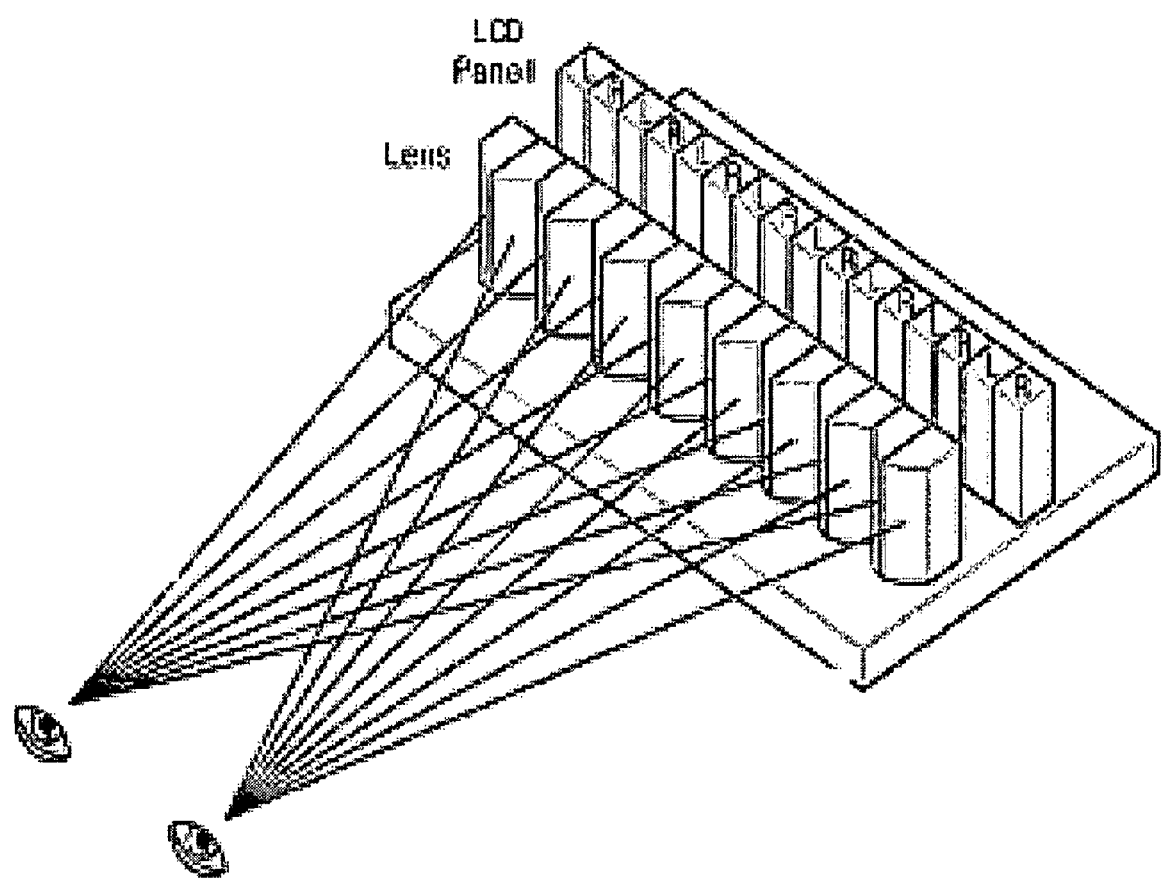
FIG. 2 shows a conceptual diagram of a typical lenticular lens method.

FIG. 2 is a conceptual diagram of a typical lenticular lens method. The lenticular lens method also realizes the separation of the images viewed by the left and right eyes through an arrangement of cylindrical lenses. That is, the images are arranged on the left and right focal surface of the lenses, called lenticular screens, of a semi-cylindrical shape. When an object is viewed through these lenses, the image is separated to give a sense of volume, without the need for glasses.

As such, the typical 3D display methods used the difference in viewing angles of the human eye, as shown in FIGS. 1 and 2. The above methods, however, required the use of eye-glasses, without which the visible viewing angle became too narrow.

Figure 3:
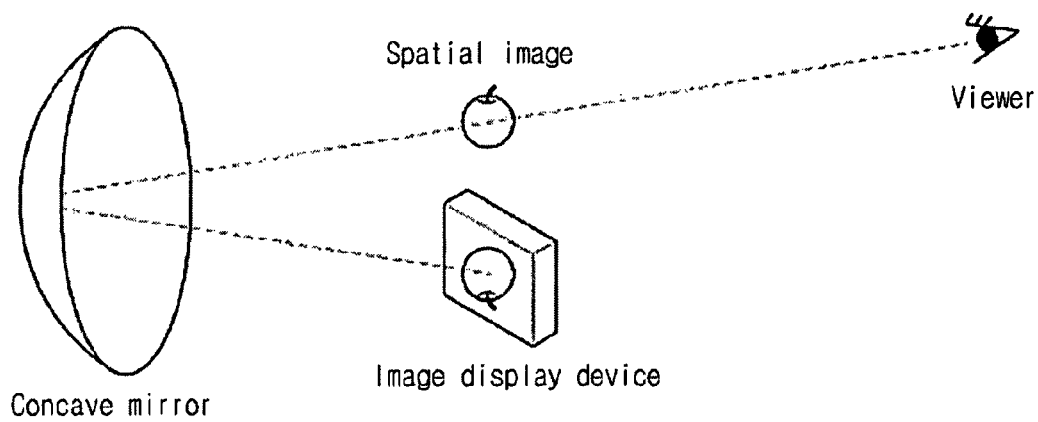
FIG. 3 shows a conceptual diagram of a typical spatial imagery method using a lens/concave mirror.

Another approach used a lens, a concave mirror or a special screen, as in FIG. 3, to project the image on the space. FIG. 3 is a conceptual diagram of a typical spatial imagery method using a lens/concave mirror.

Although it is possible to view the image projected into the space without the use of eye-glasses, the method using a lens or a concave mirror distorts the image or provides an image that is too narrow for viewing. Moreover, although it is possible to view the 3D image without the use of eye-glasses, the screen method using smoke or steam provides an inferior image because the image is formed on the smoke or steam. Suggested as another approach is a method of forming an image in the air by use of a half-mirror.

Figure 4:
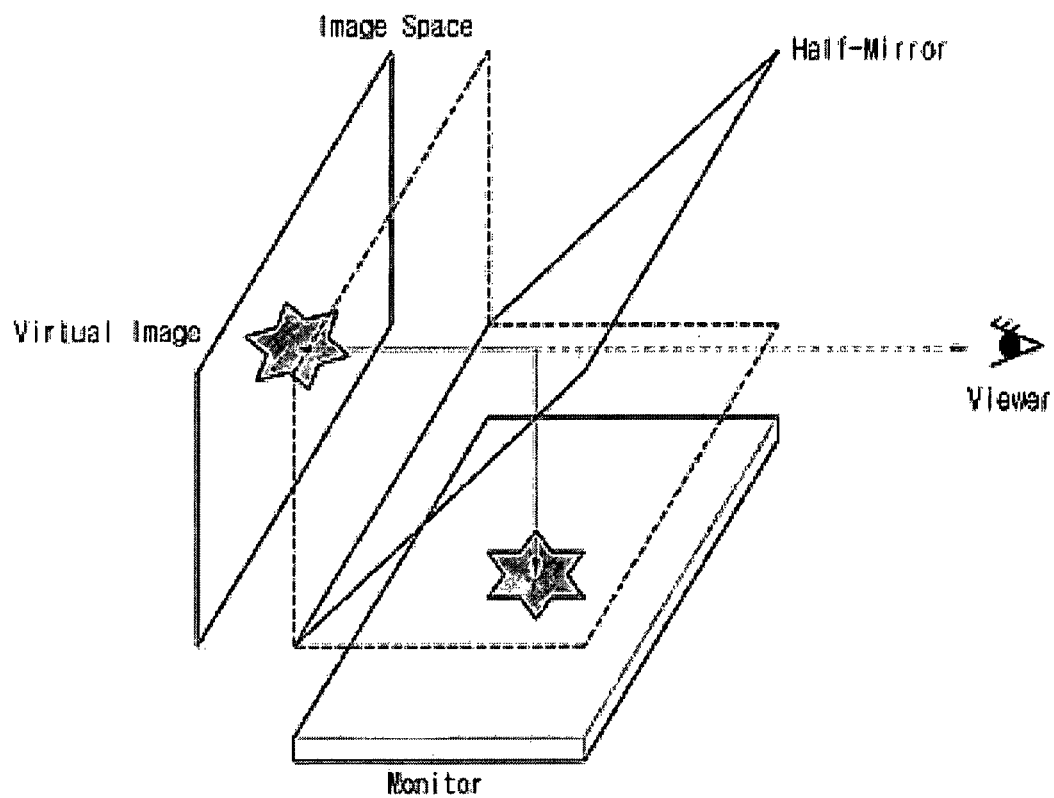
FIG. 4 shows a conceptual diagram of a typical method using a half-mirror.

FIG. 4 is a conceptual diagram of a typical method using a half-mirror. This method does not distort the image or provide an image of a narrow viewing angle. However, it still imposes a few problems.

One embodiment of the present invention enhances the sense of realism by adjusting the direction of light emitted from a display device, through modifying the barrier technology, which has been conventionally used in controlling 3D images of viewing angles.

One problem of the method of using a half-mirror is that the display device placed in the lower side is visible by the observer, reducing the sense of realism, due to the structure as shown in FIG. 4. To solve this problem, a viewing angle control filter, as shown in FIG. 7*a*, is used.

Figure 5:
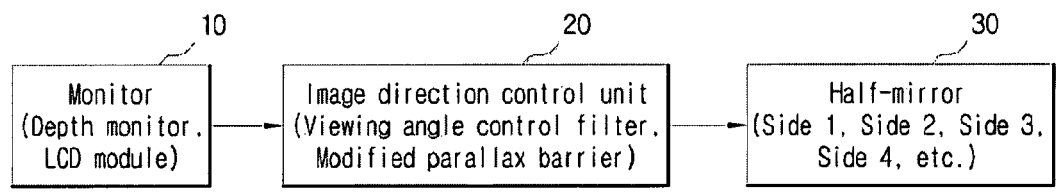
FIG. 5 shows a block diagram of an apparatus for projecting a spatial image in accordance with an embodiment of the present invention.
Figure 6:
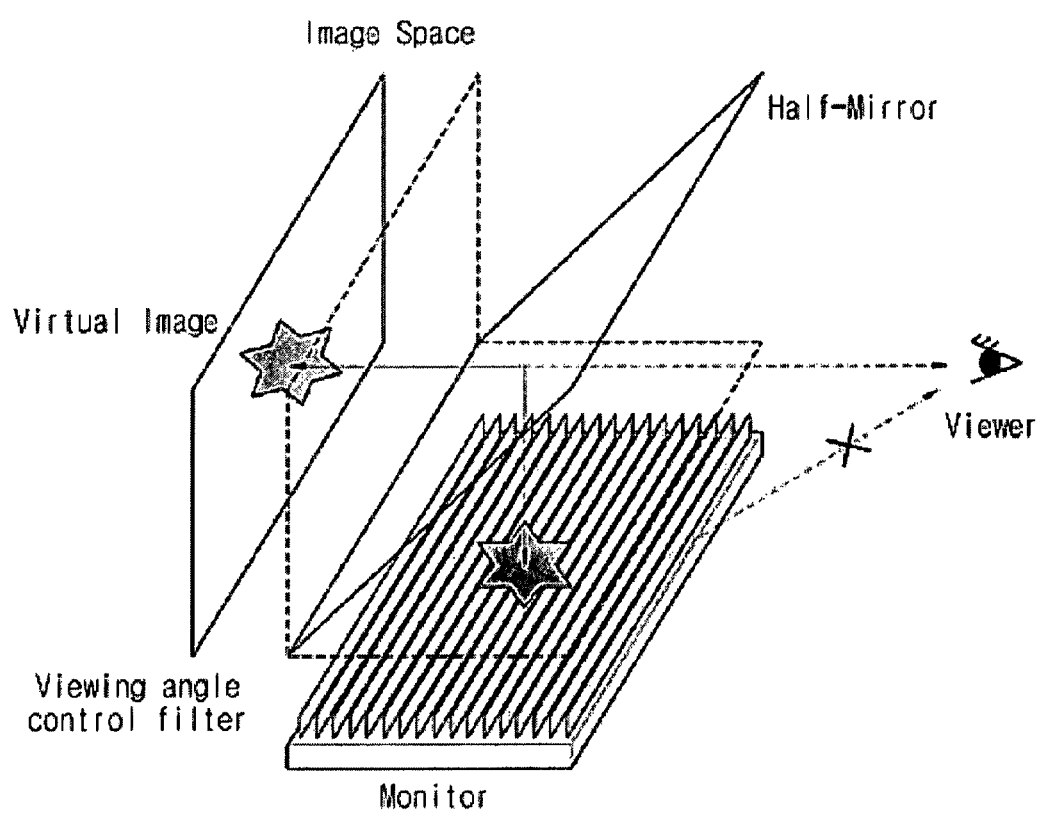
FIG. 6 shows a conceptual diagram of an embodiment of FIG. 5.
Figure 7A:
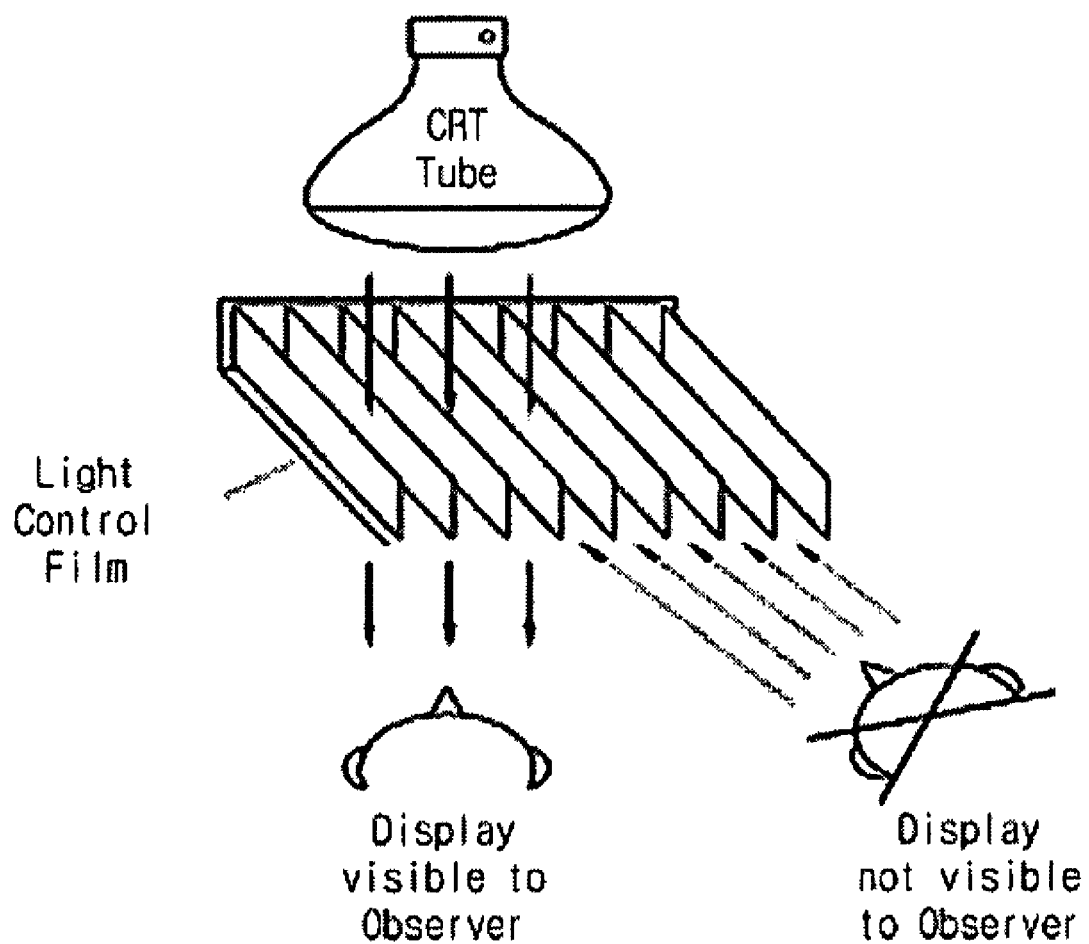
FIG. 7a shows a viewing angle control filter of FIGS. 5 and 6.
Figure 7B:
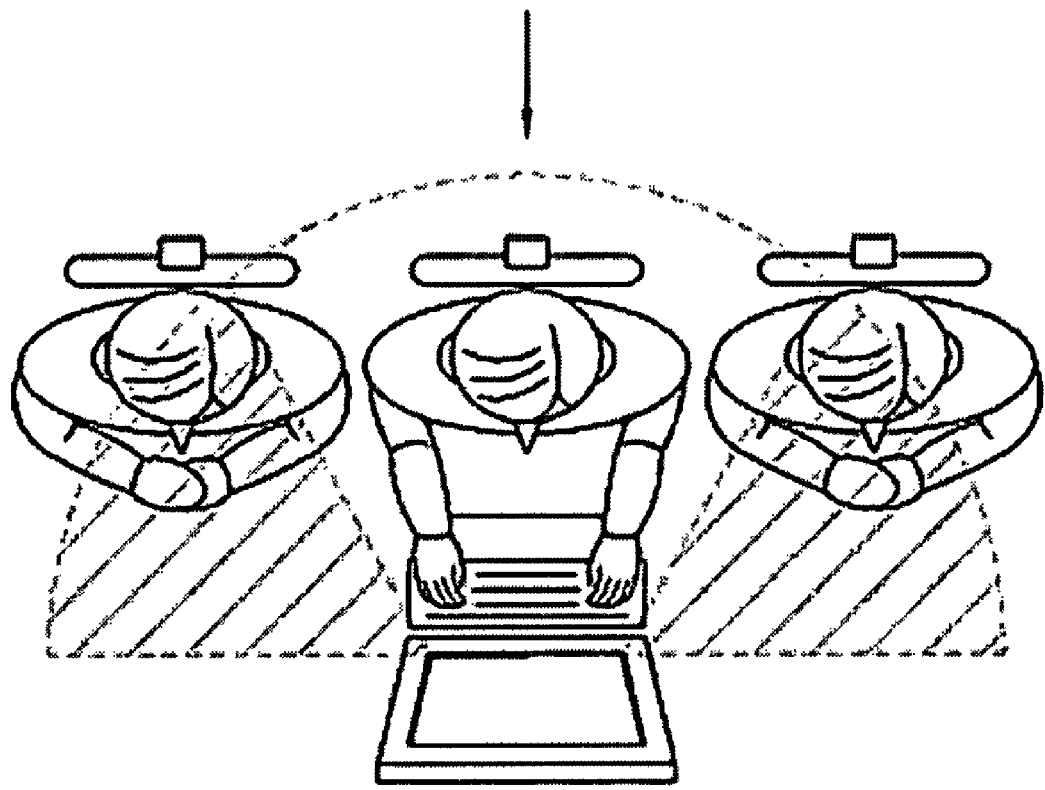
FIG. 7b shows a conceptual diagram of an example of observing an image by adjusting the viewing angle.

FIG. 7*a* is a viewing angle control filter of FIGS. 5 and 6, and FIG. 7*b* is a conceptual diagram of an example of observing an image by adjusting the viewing angle.

As the viewing angle control filter has barriers, as shown in FIG. 7*a*, the image is visible in front of the display but not visible on the left and right sides of the display. Applying this characteristic to a structure shown in FIG. 6, the image projected from the display is directed to the half-mirror and is reflected on the half-mirror to be visible by the viewer, who observes the image as if it is placed in a space in front of the viewer. Even if the viewer tried to look at the display device directly, the image would be blocked by the viewing angle control filter and not be visible by the viewer.

If the entire display device is covered by this filter, the viewer can not even see the display device itself and will see the image projected in the space only, allowing the viewer observe a more realistic image.

It is also possible to use a modified parallax barrier, shown in FIG. 8.

Figure 8A:
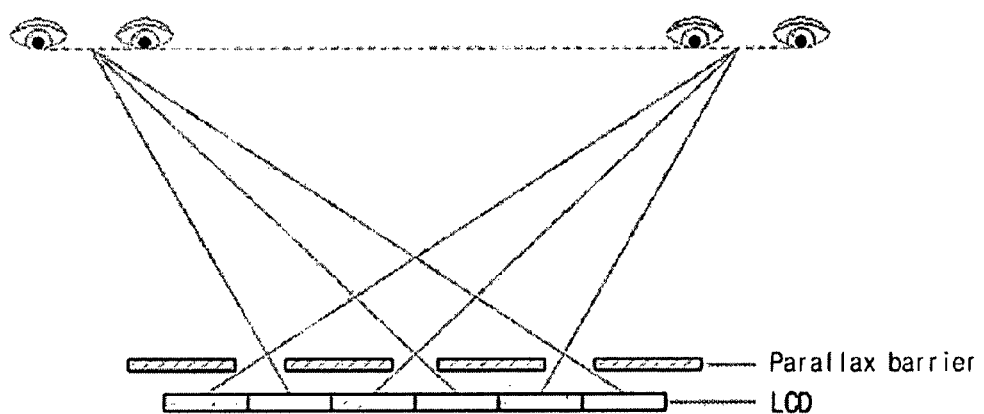
FIG. 8a shows a conceptual diagram of a modified parallax barrier for adjusting the viewing angle of FIG. 7.
Figure 8B:
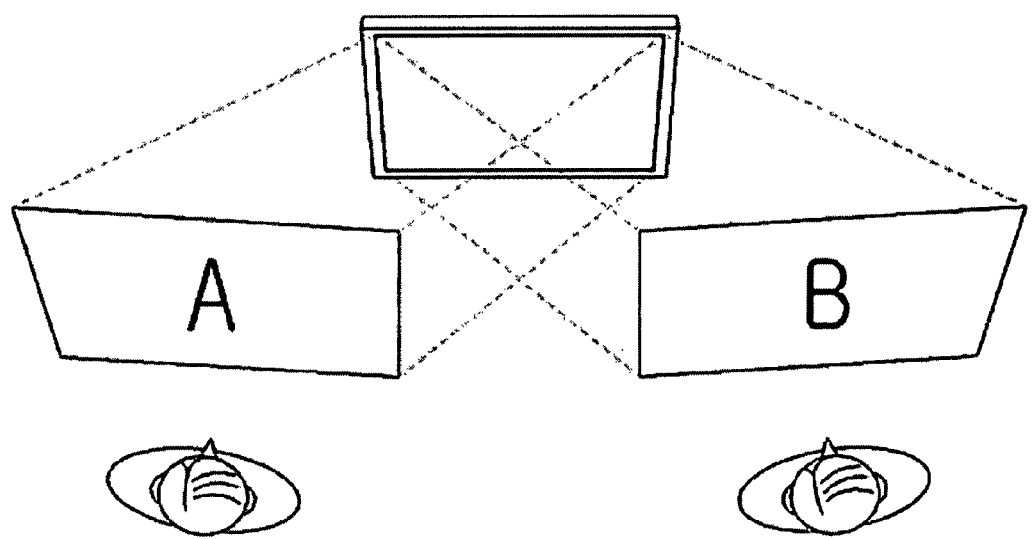
FIG. 8b shows a conceptual diagram of an example of observing different images according to different viewing fields.

FIG. 8*a* is a conceptual diagram showing a modified parallax barrier for adjusting the viewing angle of FIG. 7, and FIG. 8*b* is a conceptual diagram showing an example of observing different images according to different viewing fields.

Referring to FIG. 8*a*, a conventional parallax barrier is modified such that in the left field of the display device its corresponding image is visible. Likewise, in the right field of the display device, only its corresponding image is visible.

In other words, the image visible on the left side is not visible on the right side, and the image visible on the right side is not visible on the left side.

This feature is applied in FIG. 9, and Image A and Image B are displayed on the display device. Here, FIG. 9 is a conceptual diagram showing an example of displaying a spatial image using a parallax barrier that is modified from FIG. 6. The parallax barrier here is arranged in the lateral direction on an image-forming screen of the display device. It shall be evident that there can be a variety of modifications of the parallax barrier.

The Image A is directed to the half-mirror and reflected to the viewer, who will then see the image as if it is present in the space ahead. The other Image B is not directed to the half-mirror but is directed to the viewer directly. By inputting an image to be projected as a 3D image in the Image A and inputting a description of the Image A in the Image B, a more realistic and descriptive imagery can be created.

Figure 10:
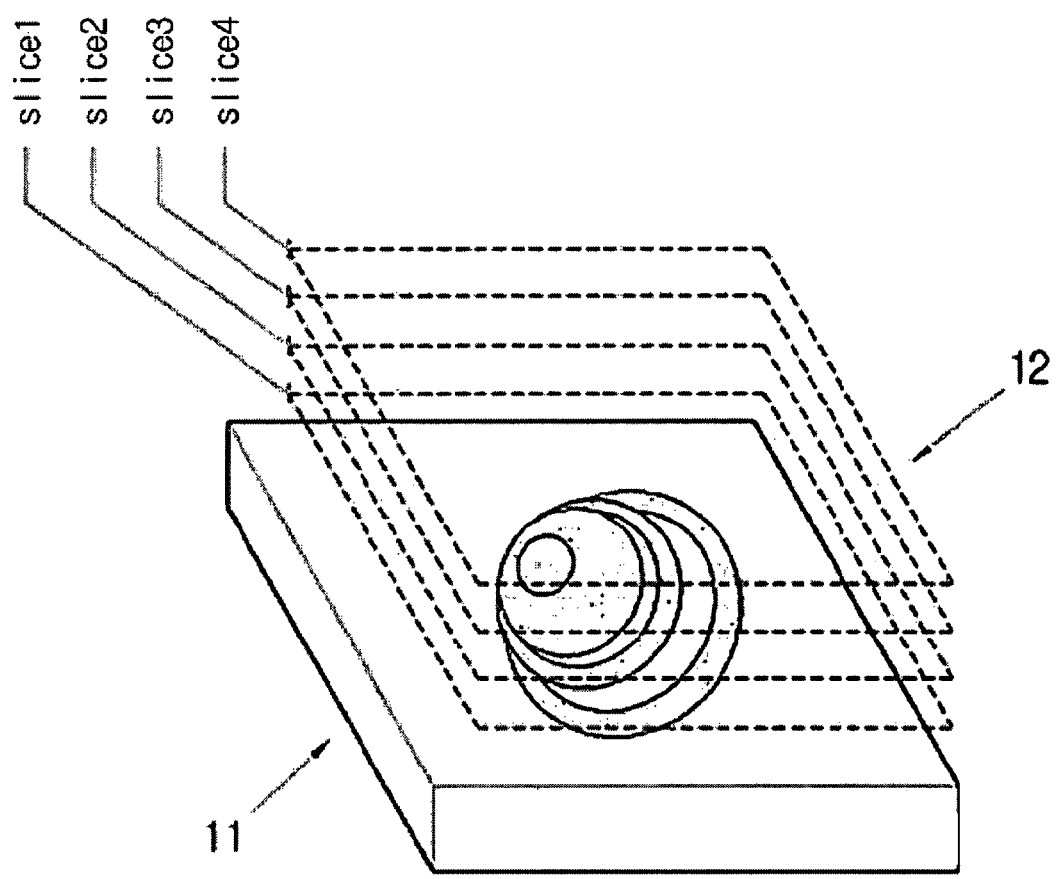
FIG. 10 shows a conceptual diagram of an example of an LCD module that is realized from FIGS. 5 and 6.

It is also possible to use a monitor that can provide a sense of depth or construct an LCD module, as shown in FIG. 10, to give a sense of depth.

FIG. 10 is a conceptual diagram showing an example of an LCD module that is realized from FIGS. 5 and 6.

Figure 11A:
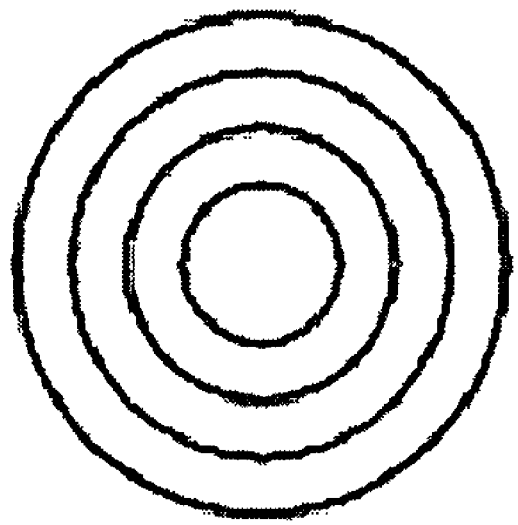
FIG. 11*a* shows a diagram of an example of an image having a shape of a 3D ball, which is inputted to FIG. 10.
Figure 11B:
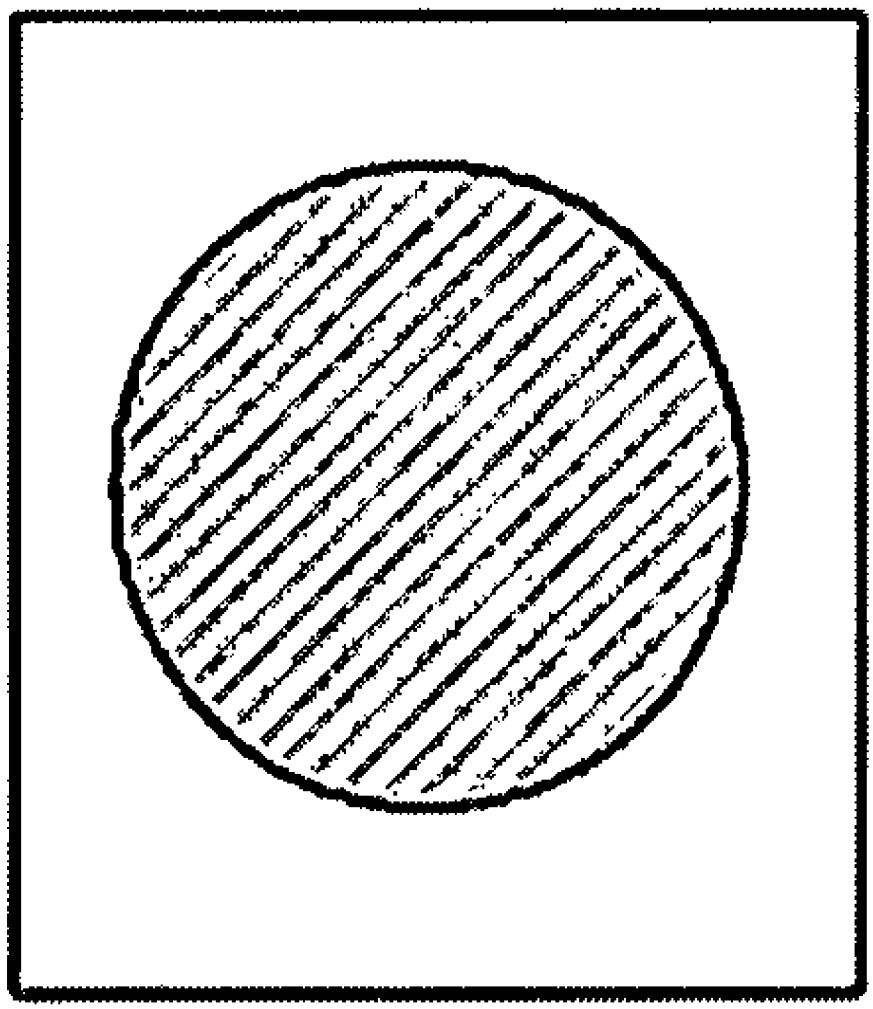
FIG. 11*b* shows a 2D image of the ball image of FIG. 11*a*.

FIG. 11a is a diagram showing an example of an image having a shape of a 3D ball, which is inputted to FIG. 10, FIG. 11b is a 2D image of the ball image of FIG. 11a, and FIG. 11c is a conceptual diagram showing an example of forming slice images of the ball image of FIG. 11a to sequentially output an image with a sense of depth.

A backlight unit 11 outputs depth information of an object, as shown in FIG. 11a. The information shown in FIG. 11a is displayed through a common display device, only an image projected on a 2D plane, as shown in FIG. 11b, is observed by the viewer.

A slicing unit 12 slices the image of FIG. 11a to sliced images shown in FIG. 11c to sequentially obtain each of the 2D sliced images. By piling up the 2D sliced images and outputting the 2D sliced images to an image direction control unit 20, a 3D image can be obtained.

Figure 12:
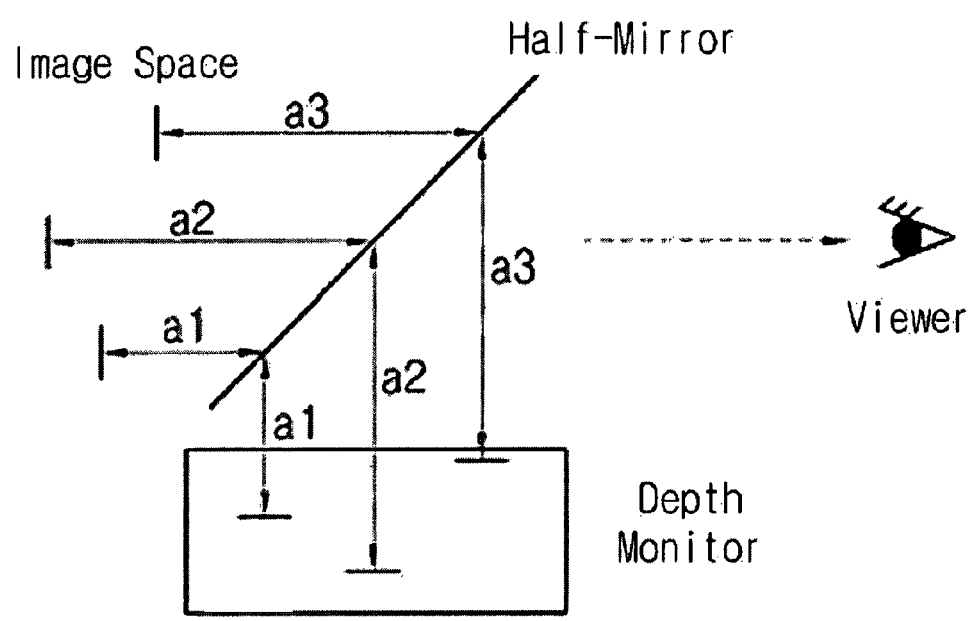
FIG. 12 shows a conceptual diagram of an example of forming a spatial image having a sense of depth from FIGS. 6 and 9.

FIG. 12 is a conceptual diagram showing an example of forming a spatial image having a sense of depth from FIGS. 6 and 9.

When images having depths of a1, a2 and a3 are displayed on the display device, these images are directed to the viewer through the half-mirror 30. As the distance between each of the images of a monitor 10, which is the display device, and the half-mirror 30 is a1, a2 and a3, respectively, the sense of depth felt in the half-mirror 30 can be a1, a2 and a3, respectively. As a result, a spatial image having a sense of depth can be reconstructed.

The systems suggested so far have been about a single plane. It is possible, however, to link several sides to reconstruct a 3D image that can be observed from 360 degrees around the image.

Figure 13:
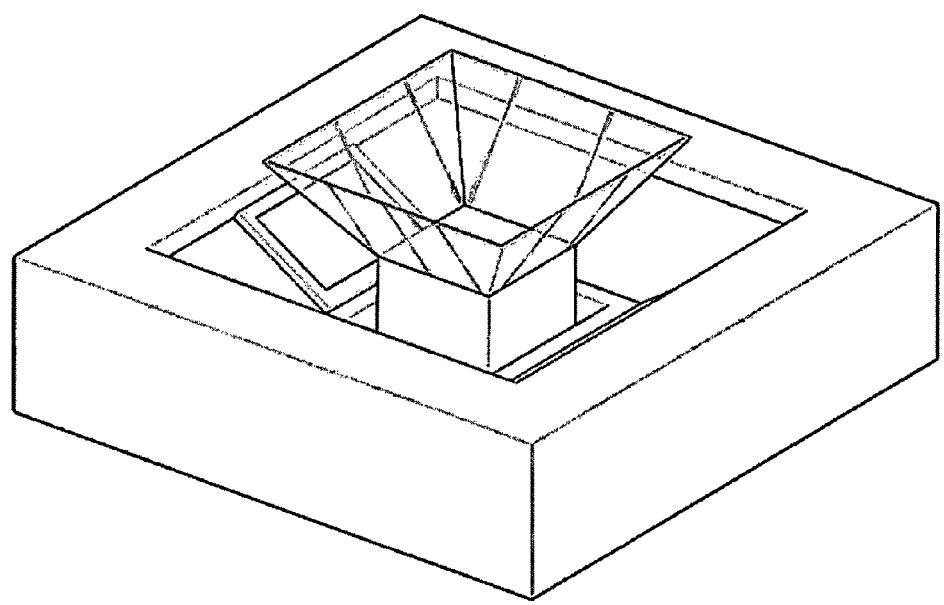
FIG. 13 shows a diagram of an example of linking 4 sides of the half-mirror from FIGS. 5 and 6.

FIG. 13 is a diagram showing an example of linking 4 sides of the half-mirror from FIGS. 5 and 6.

FIG. 13 shows a typical example of 4 sides. When 4 sides are linked and each side is inputted with an image of the front, back, right and left side, respectively, the viewer can observe the image from 360 degrees of the image.

As described above, at least one embodiment of the present invention modifies the conventional barrier technology, which has been used to control 3D images or viewing angles, to enhance the sense of realism by controlling the direction of light emitted from the display device.

Although certain embodiments of the present invention have been described, anyone of ordinary skill in the art to which the invention pertains should be able to understand that a very large number of permutations are possible without departing the spirit and scope of the present invention, which shall only be defined by the claims appended below.

What is claimed is:

1. An apparatus for projecting a spatial image, the apparatus comprising:
   a monitor configured to output the spatial image;
   an image direction controller configured to control the direction of the spatial image output from the monitor and to control a viewing angle; and
   a half-mirror configured to transflect the spatial image whose direction is adjusted by the image direction controller.

2. The apparatus of claim 1, wherein the monitor is configured to provide a sense of depth.

3. The apparatus of claim 1, wherein the monitor comprises an LCD module configured to provide a sense of depth.

4. The apparatus of claim 3, wherein the LCD module comprises:
   a backlight unit configured to output an image having information on the depth of an object;
   a slicing unit configured to obtain sliced images sequentially in accordance with the depth information output from the backlight unit and output the images after piling up the images.

5. The apparatus of claim 1, wherein the image direction controller comprises a viewing angle control filter configured to control a viewing angle through polarization of light.

6. The apparatus of claim 5, wherein the viewing angle control filter is configured to control the viewing angle such that an observer can see a three-dimensional illusion through the half-mirror but not directly on the monitor.

7. The apparatus of claim 1, wherein the image direction controller comprises a modified parallax barrier.

8. The apparatus of claim 7, wherein the modified parallax barrier is configured to control the viewing angle such that an observer can see a three-dimensional (3D) illusion through the half-mirror but see an image other than the 3D illusion directly on the monitor.

9. The apparatus of claim 1, wherein the half-mirror comprises one or more sides.

10. The apparatus of claim 9, wherein the half-mirror comprises four sides, the monitor is configured to output front, back, left and right images, and the image direction controller is configured to control viewing angles of the four sides of the half-mirror.

11. A method of projecting a spatial image, the method comprising:
    outputting a spatial image having a sense of depth through a monitor;
    controlling, at an image direction control unit, a direction of the spatial image and controlling a viewing angle; and
    projecting the spatial image through a half-mirror after the controlling.

12. The method of claim 11, wherein the controlling comprises controlling the viewing angle by a viewing angle control filter using polarization of light such that an observer can see a three-dimensional (3D) illusion through the half-mirror but not directly on the monitor.

13. The method of claim 11, wherein the controlling comprises controlling the viewing angle by a modified parallax barrier such that an observer can see a three-dimensional (3D) illusion through the half-mirror but see an image other than the 3D illusion directly on the monitor.

14. The method of claim 11, wherein the projecting comprises projecting the spatial image through the half-mirror that includes one or more sides.

15. An apparatus for projecting a spatial image, comprising:
    means for outputting a spatial image having a sense of depth;
    means for controlling the direction of the spatial image output from the outputting means and controlling a viewing angle; and
    means for transflecting the spatial image whose direction is adjusted by the image controlling means.

* * * * *